3,447,582
APPARATUS FOR TREATING POLYMERS AND
THE LIKE
Louis F. Street, Hampton, N.J., assignor to Frank W.
Egan & Co., Somerville, N.J., a corporation of New
Jersey
Filed Aug. 1, 1967, Ser. No. 657,579
Int. Cl. B01d 1/22, 1/28
U.S. Cl. 159—7                                    17 Claims

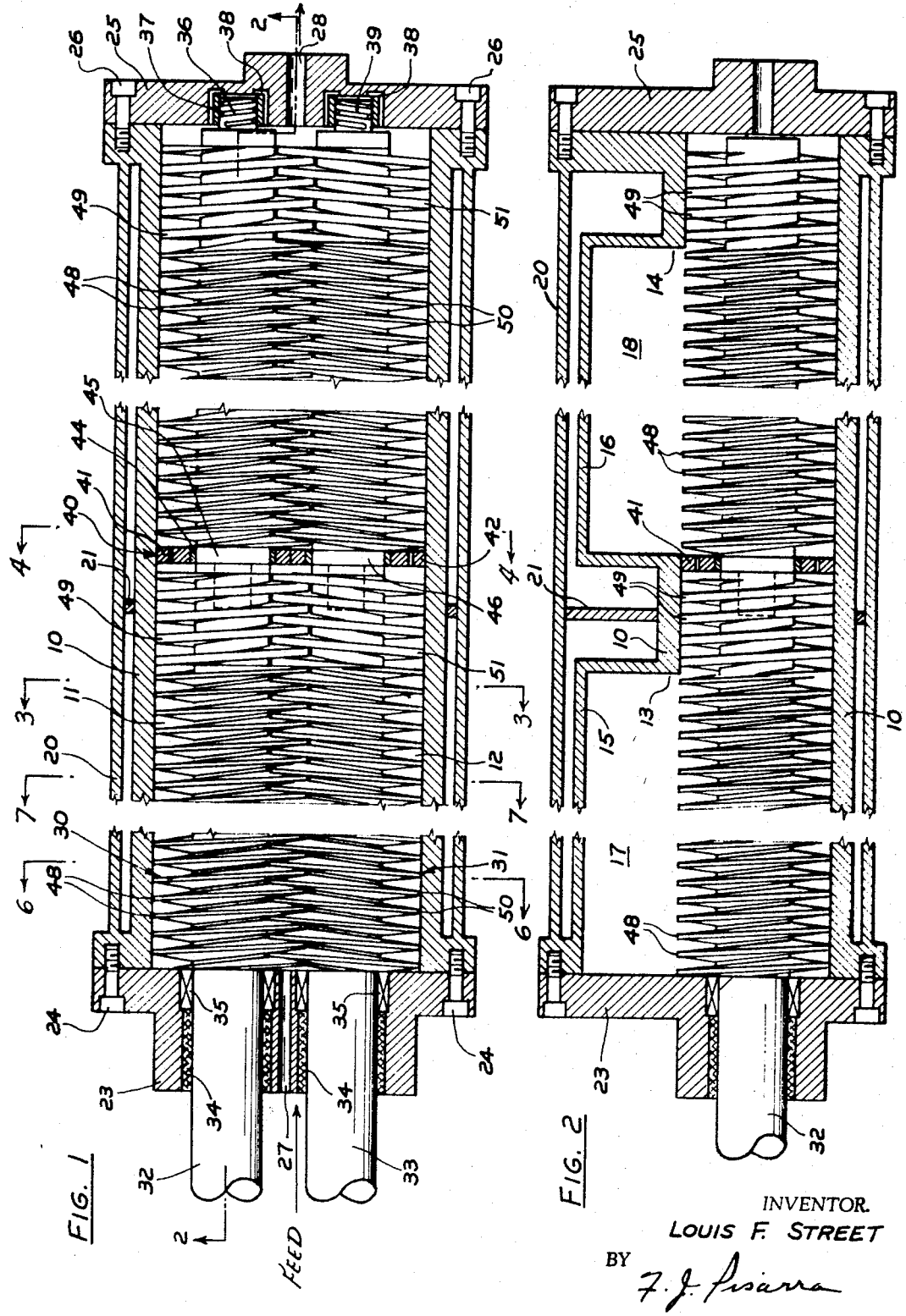

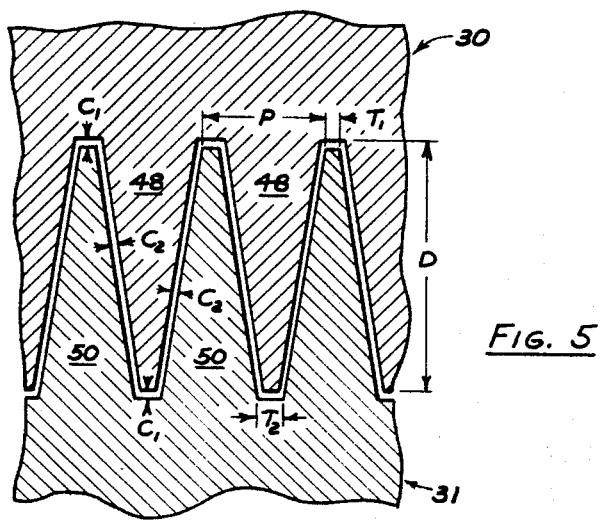
Fig. 5
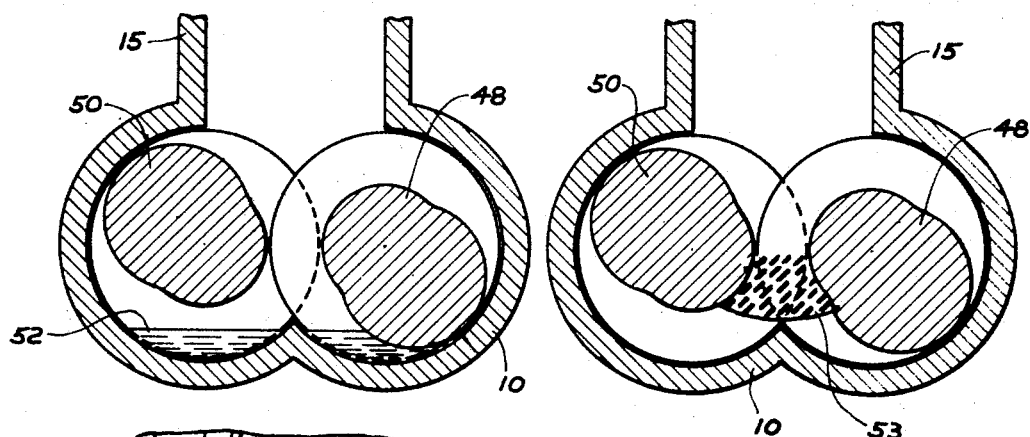
Fig. 6
Fig. 7
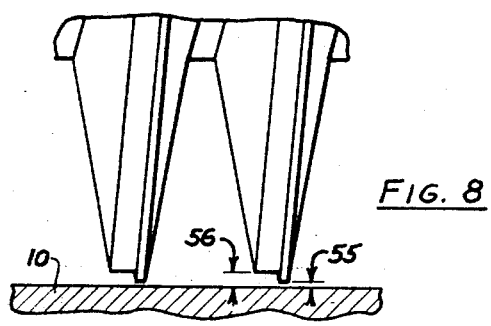
Fig. 8
INVENTOR.
LOUIS F. STREET United States Patent Office 3,447,582
Patented June 3, 1969

ABSTRACT OF THE DISCLOSURE

Liquid treating apparatus adapted, among other things in use, to promote the polymerization of thermoplastic materials by means of a twin screw reactor including a barrel having a pair of intersecting parallel, horizontal bores and a pair of screws of opposite hand having intermeshing generally V-shaped helical threads, the screws being positioned in corresponding bores and being rotatable in unison in opposite directions. The material to be treated is introduced in liquid state into the bores at one end of the barrel, is uniformly treated and advanced through the barrel by the screws and is discharged from the bores at the other end of the barrel. In the course of treatment, thin films of the material are carried by the threads and exposed to vacuum which effects removal of volatile constituents. In order to attain desirable large total area of exposed thin films relative to the size of the reactor, certain clearance distances and the pitch and depth of the V-shaped threads are maintained within predetermined ranges.

Background of the invention

This invention relates to the treatment of materials, such as liquid polymers. The invention pertains, in one of its more specific aspects, to a twin screw reactor that is adapted to be advantageously employed to promote the polymerization of thermoplastics and similar materials in liquid state.

Known related prior art developments are disclosed in the following United States patents: No. 1,468,379 to R. W. Easton, No. 2,434,707 to W. R. Marshall, No. 2,992,679 to W. W. Twaddle and No. 3,082,816 to R. H. Skidmore. While the constructions revealed in these patents represent purported advances in the art, none is believed capable of adequately attaining the several objectives, advantages and benefits of the present invention.

The apparatus of this invention has wide application. It is especially useful in polymerizing liquid thermoplastics. For this reason, the ensuing discussion and the detailed description that follows will be directed to the treatment of polymers by way of example.

As is well known, condensation of volatile constituents of liquid plastic occurs during a polymerization procedure and the presence of such constituents inhibits and retards polymerization. It is, therefore, important that such constituents be removed continuously from the material being treated. To this end, the material is usually exposed to vacuum during treatment. In order that the vacuum removal be effective and the maximum amount of volatile constituents be withdrawn in the shortest time period possible, it is essential that a maximum area of the material undergoing polymerization be exposed to the vacuum while the material is passing through a reactor unit. The maximum area of exposure may be attained by causing the material to flow in the form of thin film through a vacuum chamber. The present invention provides apparatus for attaining desirable large total area of exposed thin films relative to the size of the reactor, as will be evident from the detailed description further along herein. Moreover, and as will also be discussed below, the exposed area of thin film flow may be readily varied by changing the operating conditions of the apparatus, such as screw speed and/or rate of feed.

To obtain a satisfactory end product, it is necessary that the material be treated uniformly in the reactor. This requires, first, that the residence time of each particle of the material be as nearly as possible the same as that of any other particle, residence time being the time elapsing between entrance and exit of a particle into and from the reactor. Secondly, each particle of the material must be subjected to the same treatment as any other particle during its passage through the apparatus, thereby resulting in proper distributive mixing in the reactor. The above enumerated requirements are effectively accomplished by the apparatus of this invention.

Summary of the invention

As was indicated earlier herein, the apparatus of this invention is in the nature of a twin screw reactor that is adapted to effectively, uniformly and economically treat various materials, including liquid polymers, and to remove volatile constituents therefrom in the course of treatment.

A preferred arrangement of apparatus embodying the invention comprises a barrel which defines a pair of generally horizontal, parallel, intersecting bores. The barrel is provided with an upper passage which establishes communication between the bores and the exterior of the barrel. Mounted on the barrel is a hood which defines a chamber that communicates with the bores by way of the passage. The hood is adapted to be subjected to vacuum. Each of a pair of intermeshing screws is positioned in a corresponding bore. At least one portion of each screw includes a plurality of generally V-shaped helical threads which mesh with corresponding threads of the other screw. The screws are of opposite hand and are rotatable in unison in opposite directions. The apparatus includes inlet means for introducing a continuous stream of material to be treated into the bores at one end of the barrel and outlet means for discharging treated material from the bores at the other end of the barrel.

Rotation of the screws raises portions of the material from the lower part of the barrel through clearances between the screw flights, thereby effecting distribution thereof in the form of thin films upon the flights in the upper part of the barrel which is exposed to vacuum created in the chamber. At the same time, due to the helical configuration of the threads, the material is advanced towards the outlet end of the barrel. To attain desirable maximum film area exposure, certain clearance distances and the pitch and depth of the V-shaped threads are maintained within predetermined ranges which will be set forth further along herein.

The principal object of this invention is to provide an improved apparatus for economically treating a continuous stream of a material, such as a liquid polymer, in a manner to effect proper exposure and ready removal of volatile constituents of the material.

Another object of this invention is to provide apparatus for treating a liquid polymer under vacuum for removal of volatile constituents from the polymer by exposure to the vacuum of relatively large surface areas of the polymer in the course of treatment.

It is another object of this invention to provide a polymer treating apparatus which has its parts so constructed and arranged that adjacent portions of material under treatment largely tend to advance successively through the apparatus, to thereby attain a high degree of plug flow with minimum intermixing of later fed material with earlier fed material as is characteristic of known reactors, such as conventional plastic screw extruders.

A further object of this invention is the attainment, in polymer treating apparatus, of a high degree of local mixing of the polymer and repeated exposure to vacuum of new relatively thin expanses thereof.

A still further object of this invention is to provide apparatus of the type indicated that is simple and compact in design; that is sturdy and durable in construction; that is reasonable in manufacturing, operating and maintenance costs; that is adapted to be advantageously employed in the treatment of a variety of specific liquid materials; and that is capable of performing its intended functions in an efficient, dependable and economical manner.

The enumerated objects and additional objects, together with the advantages of this invention, will be readily apparent to persons trained in the art from the following detailed description taken with the accompanying drawings which respectively describe and illustrate a preferred embodiment of the invention.

*Brief description of the drawings*

In the drawings wherein like reference characters denote corresponding parts throughout the several views:

FIG. 1 is a view in horizontal cross section of an arrangement of apparatus according to this invention;

FIG. 2 is a sectional view taken along staggered line 2—2 of FIG. 1;

FIG. 5 is an enlarged fragmentary sectional view of meshing portions of the two screws which are also shown in other views;

FIG. 6 is a sectional view taken along line 6—6 of FIG. 1, parts being omitted;

FIG. 7 is a view corresponding to FIG. 6 and is taken along line 7—7 of FIG. 1; and FIG. 8 is a fragmentary view of a modified form of screw configuration.

*Description of the preferred embodiment*

Figure 3:
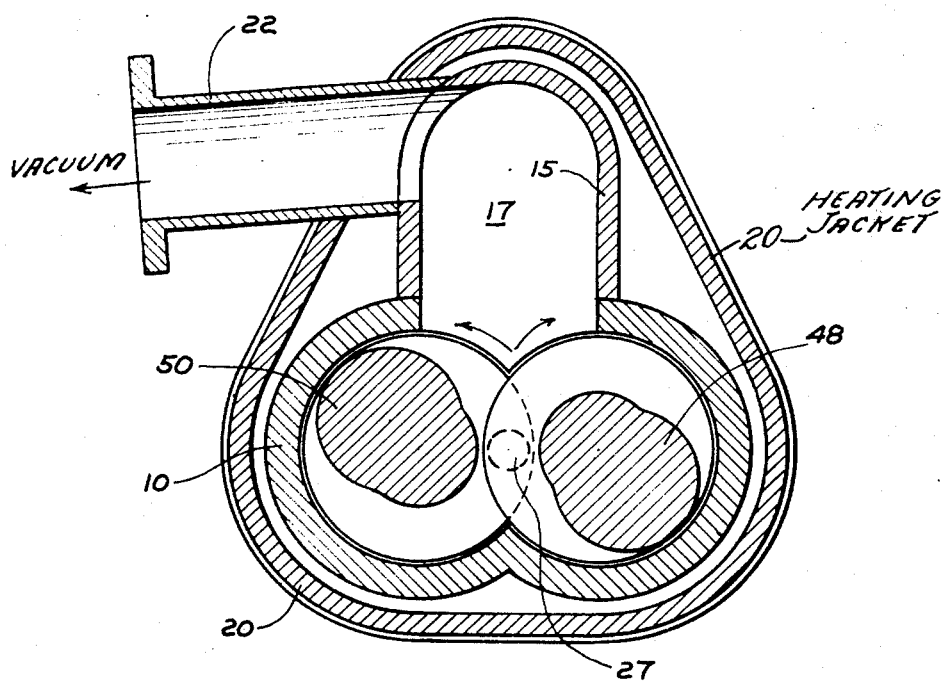
FIG. 3 is an enlarged sectional view taken along line 3—3 of FIG. 1.

Referring now to the drawings, the illustrated embodiment of the invention comprises a barrel 10 that is provided with a pair of parallel, horizontal, intersecting bores 11 and 12. The upper portion of the barrel is cut out to form spaced elongated openings or passages 13 and 14 which communicate with both bores. Mounted on the barrel is a pair of hoods 15 and 16 which define chambers 17 and 18, respectively. As is shown in FIGS. 2 and 3, chamber 17 communicates with the bores by way of passage 13 while chamber 18 communicates with the bores by way of passage 14.

A jacket 20 surrounds and is spaced from the barrel and the hoods. A suitable heat transfer fluid is adapted to be introduced into and circulated through the space between the jacket and the barrel and hoods by conventional external means (not shown). The interior of the jacket is divided into two sections by a partition 21 whereby the temperatures within the two chambers may be controlled independently. A conduit 22 establishes communication between chamber 17 and a source of vacuum (not shown). A like conduit (not shown) established communication between chamber 18 and the same or a separate source of vacuum, if desired.

A feed end plate 23 is attached to the rear end of the barrel by screws 24 (FIG. 1) while a discharge end plate 25 is attached to the forward end of the barrel by screws 26. Plate 23 has an inlet passage 27 for introducing a continuous stream of liquid material to be treated into the rear ends of bores 11 and 12. Plate 25 has an outlet passage 28 for discharging treated material from the forward ends of the bores.

Positioned in barrel bores 11 and 12 are respective reactor screws 30 and 31. Screw 30 includes a drive shank 32 which extends through end plate 23. Screw 31 includes a like drive shank 33 which also extends through this end plate. The screw drive shanks are supported for rotation in corresponding bearings 34 and shaft seals 35 that are located in end plate 23. The screws are adapted to be operated in unison by conventional driving means (not shown). Each screw also includes an end portion 36 which is remote from its drive shank and which is journaled in a corresponding sleeve bearing 37 in end plate 25. Passages 38 in end plate 25 establish communication between the inner end of each sleeve bearing and the corresponding barrel bore (FIG. 1). Each screw portion 36 is provided with a helical peripheral groove 39. These grooves serve to forward any material which enters the sleeve bearings to the blind ends of the bearing bores from whence it is returned to the barrel bores by way of passages 38. This arrangement prevents stagnation and consequent degradation of any of the material which otherwise might tend to collect in the bearings.

Figure 4:
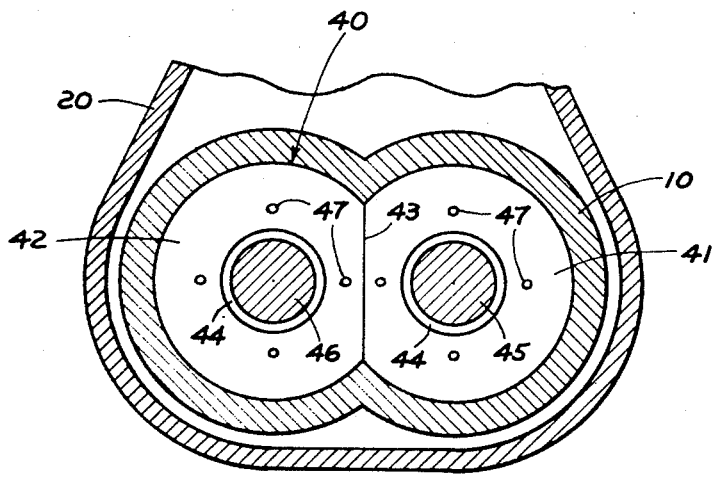
FIG. 4 is an enlarged sectional view taken along line 4—4 of FIG. 1.

Located between chambers 17 and 18 is a combined screw support and partition unit 40 which is best shown in FIGS. 1 and 4 and which comprises a pair of coplanar plates 41 and 42. These plates are made from circular members which are cut to obtain rectilinear edges that are arranged in abutting relationship, as indicated at 43. Plate 41 is provided with a sleeve bearing 44 to receive and support an intermediate portion 45 of screw 30. Plate 42 is provided with a like sleeve bearing to receive and support an intermediate portion 46 of screw 31. The illustrated arrangement of unit 40 and its sleeve bearings 44 not only provides desirable support for the screws but also prevents objectionable radial movement of the screw shafts. Each plate 41 and 42 has a plurality of through openings 47 to permit flow of the material during treatment from the portions of the bores communicating with chamber 17 to the portions of the bores communicating with chamber 18.

Each screw 30 and 31 is made in two sections which are coupled adjacent unit 40. One section of each screw is positioned between feed inlet plate 23 and unit 40 while the other section of each screw is positioned between unit 40 and discharged end plate 25. Each section of screw 30 has a series of tapered, generally V-shaped helical threads 48 and a series of generally square helical threads 49. Each section of screw 31 also has a series of tapered, generally V-shaped helical threads 50 and a series of generally square helical threads 51. As is indicated in FIG. 2, barrel openings 13 and 14 are coextensive with corresponding series of V-shaped threads 48 and 50. The square threads 49 and 51 are fully circumscribed and encased within the barrel and subject the material to a positive forwarding action during operation.

The screws are of opposite hand leads and may be of equal or different outside diameters. In either case, the distance between the center lines of the screws is less than one half the sum of the outside diameters of the screws so that the flights of the screws intermesh, as shown.

Material to be polymerized is introduced into the barrel 10 through feed inlet passage 27 where it flows by gravity to the bottom portion of the bores 11 and 12, as indicated at 52 in FIG. 6. At this time, the material is of relatively low viscosity. Rotation of the screws moves the material along the bores toward the discharge end of the barrel and, at the same time, lifts a portion of the material upwards on the flights to the meshing point of the two screws. Here the gaps between the flights of the V-shaped threads of the two screws, which are denoted as $C_1$ and $C_2$ in FIG. 5, meter the thickness of the film of material that is allowed to pass through the meshing point and thus determine the thickness of the layer of material that adheres to the flights and is carried around with the rotation of the screws until it again joins the material in the bottom portion of the barrel. Gap $C_1$ represents the clearance distance between the outer diameter of the V-shaped threads of one of the screws and the inner diameter of the V-shaped threads of the other screw. Gap $C_2$ represents the distance between a side surface of a V-shaped thread of one of the screws and the thereopposite side surface of the next adjacent V-shaped thread of the other screw. For best results, the gaps $C_1$ and $C_2$ should be within the range of from 2% to 6% of the cube root of the outside diameter of either screw.

During its movement on the flights, the layer of material is exposed to a vacuum maintained in the barrel and vacuum chamber 17, which vacuum removes the volatile products of polymerization by way of conduit 22. As the material advances along the barrel, the process of polymerization continues and the viscosity of the material increases. In some instances, the viscosity increases to the extent that the major portion of the material will cling to the flights and form a bank of material under the meshing point of the flights, as indicated by numeral 53 in FIG. 7.

Upon reaching the sections of the screws having square threads 49 and 51, the material is positively advanced under pressure and passes through the openings 47 in partitioning unit 40 and thence into the forward section of the reactor. Operation in the forward section is similar to that described above for the rear section. The treated material is pumped out of the reactor through discharge passage 28 by the square threaded pumping section on the discharge end of the screws.

During operation, the temperature of each chamber may be accurately controlled by the heat transfer fluid circulating in the jacket 20. The vacuum in each section may be independently controlled, as required, since the bearing plates 41 and 42 form a sealing wall between the two sections.

In order to attain the maximum exposed surface area in the reactor, it is desirable to provide screw flights of short pitch and large depth. To this end, it has been ascertained that in accordance with this invention the pitch of the V-shaped threads of each screw should be within the range of from 5% to 15% of its outside diameter and the depths of such threads should be within the range of from 20% to 30% of its outside diameter.

This configuration of short lead and deep flight is desirable because it increases the two primary factors that permit increase in rate out of a unit otherwise the same. It is quite clear that the desired configuration increases the surface area on the sides of the screw flights for any given unit of length of a screw of a given outside diameter. Since the material being processed is drawn through the centerline gap by the rotation of the screws, the entire screw surface is coated with polymer. If, for example, a material enters the system at a viscosity of 100 poises and the screws are turning at twenty r.p.m., any tendency for gravity flow of the material will be very slow relative to the screw rotation and the coating on the sides of the screws will be relatively uniform. The surface area exposed in relation to each pound of material processed is satisfactorily calculated by multiplying the entire surface area on both screws in that portion of the machine being calculated by the number of revolutions necessary to eject one pound of product. This gives a figure in square inches exposed per pound of product. Typical figures for condensation polymerization processes have been from 50,000 to 400,000 square inches per pound.

The material coating the sides of the flights also adds to the material inventory in a given machine and in many cases is the larger portion of material, exceeding that held in the bank 53. Adequate residence time is usually important for proper completion of the process and the material coating the sides and root of the screws adds to this residence time. A satisfactory calculation of residence time can be made by dividing the total pounds of material in the unit at any given moment by the output in pounds per hour and the answer is residence time in hours. Furthermore, it will be evident that increasing the size of the gap will increase the thickness of the layer of material on the sides of the screw flights and the inventory in the device and thus will increase the residence time at a given throughput.

The material that coats the screw flights is usually in the form of a film that is thicker than the mathematically expected figure of one half the gap on each screw surface. This is because the surfaces of the screw operate on the material in the bank 53 and generate some pressure on it to drive it through the gap. Thus both the rotational dragging effect of the screws and the pressure combine to cause the material flow through the gap. It is not unusual for the surface film on the screw flights to equal in thickness the size of the gap, thus the material flows through the gap at twice the average rate of travel of the adjacent surfaces.

There is a limit as to how short the lead can be and also as to how deep the flight can be. The lead must be long enough and the flight section thick enough to maintain the material on the sides of the screw flights in an open condition, that is, with the film surfaces exposed for devolatilization. It is clear that if the cross section of the screw flights as shown in FIG. 5 were too small because of a very short lead, the material would close in behind the screw flight after flowing through the gap and reduce or eliminate the exposed surfaces of polymer. The gap must be held small enough to prevent this and normally increase only slightly with increase in machine size. To represent this slow rate of increase in gap the cube root of the screw diameter is used as the basis of comparison.

The maximum depth of the screw threads is limited by mechanical, as well as process considerations. Appreciable torque is required to turn the screws in producing polymers of moderately high viscosity in the range of 10,000 to 15,000 poises. Thus the screw root must be large enough to transmit this load. Because of the deep narrow gap of the screw channel, devolatilization is somewhat reduced toward the screw root and the deeper and narrower the gap between film surfaces the greater the reduction in devolatilization.

Taking as an example a reactor with the following dimensions, referenced to FIG. 5:

|   | Inches |
|---|---|
| Diameter of each barrel bore | 7.000 |
| Distance between screw centers | 5.250 |
| Outside diameter of each screw | 6.986 |
| Pitch P | .875 |
| Flight depth D | 1.868 |
| Flight land $T_1$ | .100 |
| Flight groove $T_2$ | .187 |
| Screw length | 30.000 |
| Gap $C_1$ | .187 |
| Gap $C_2$ | .064 |

It can then be calculated that the surface area of the V-shaped threads of each screw is approximately 2,220 square inches or a total of 4,440 square inches for the portions of the two screws in the rear section of the reactor. In order to determine the area that is exposed to vacuum, the surface area of the portion of the flights that is submerged in the material in the bottom of the barrel or that is covered by the bank of material at the meshing point must be subtracted from the above figures. It will be appreciated from this that a simple way to obtain the required exposed surface area for various materials can be attained by adjusting the depth of the material in the barrel by controlling the feed rate to the reactor. An any constant rotational speed of the screws, a higher feed rate will result in a higher level of material in the chamber and, therefore, a smaller exposure area.

Using the dimensions of the above example and controlling the depth of material in the barrels at .250", it can be calculated that at any time approximately 70% of the material in the chamber will be on the screw flights exposed to the vacuum. By changing the gap clearances, it is possible to thereby change the thickness of the layer of material that is held on the flights. By this means, it is apparent that the amount of material held on the upper part of the screw flights and, therefore, not in transport at that moment through the reactor, can be readily varied and this will result in a corresponding variation in total residence time of the material in the rear section relative to the rate of output of the material being transported through the reactor. It is, of course, the material which is not rotating with the screws and which is below the centerline pinch between the two screws that is being transported toward the outlet.

In processing a material in which a reaction is taking place, it is important to be able to vary each of these factors. The varying of the gap at the centerline where the screws approach each other will vary the residence time relative to other operating conditions whereas the quantity of feed being introduced into the mechanism relative to the r.p.m. of the screws will vary the amount of fill in the screws and, therefore, vary the amount of exposed surface from one set of conditions to another. By control of these variables, a wide range of conditions in regard to total residence time of the material in process and the amount of surface exposed to devolatilization per pound of product going through can be brought to the desirable point for maximum efficiency and maximum product quality.

Referring to the forward section of the reactor into which the material is admitted by way of openings 47, it is assumed that gap $C_2$ is .064" and the apparatus is processing a liquid polymer having a specific gravity of approximately 1.2 and operating at 36 r.p.m. of the screws and a feed rate of 30 pounds per hour. A residence time of about 20 minutes is obtained in this section and the surface area exposed is approximately 310,000 square inches per pound of product being processed with 645 mixing and re-exposures of new surfaces for the indicated feed rate. It will be evident that this offers a very great surface area for constituent devolatilization and excellent mixing and re-exposure for high efficiency in devolatilization. These factors result in a rapid performance of the process and a greatly reduced time to bring the polymerization up to a desired point. Furthermore, the relatively high degree of plug flow resulting from the manner in which the material is treated in this apparatus produces a superior quality product. Where large surface area exposure is required, the lead of the screws is preferably less than 15% of the outside diameter of the screws and the flight depth is preferably in the order of 25% of the outside diameter.

For performance according to the above-described conditions, the fill level of material in the reactor is very small and normally the material being treated will be of such a viscosity that the screws will raise the material off the bottom of the reactor and the excess material, which is not rotating with the screws and is in transport toward the discharge end of the reactor, will be in the form of a bank below the nip of the screws much in the way a bank of material rests upon the nip of the rolls in a two roll mill except that here the bank of material is below the nip. If reaction time is relatively short and it is not necessary to have as long a residence time or to expose as large a surface area relative to each pound being processed, then the feed rate may be increased without increasing the speed of the screws to a value in the order of 600 to 700 pounds per hour when the fill level reaches the horizontal centerline and the entire lower half of the bores is filled. Other changes in performance may be achieved by changing the lead and depth of the screws as well as speed of rotation.

In other devolatilization processes, the large surface area exposed by illustrated construction may be used to obtain still higher throughput rates, if desired. If the lead of the screws were increased to twice the value referred to above and the r.p.m. of the screws also were increased to twice the speed mentioned above, the output capacity would be approximately four times the 600 to 700 pounds mentioned or in the range of about 2500 pounds per hour for the same size reactor. This procedure may be advantageously employed in the treatment of a polystyrene where it may be desirable to remove some solvents or monomers from the material. It will be appreciated that mixing for coloring or dispersion of additives may be performed at the same time. Similar treatment may be imparted to any liquid material of appropriate viscosity, such as practically any commercially available thermoplastic. In operation where devolatilization is easier and less surface area of exposure is required, a longer lead may be used on the screw for higher rate of throughput at a given r.p.m. of the screws. In this case, the leads may vary from 20% to 25% of the screw outside diameter.

Utilization of this invention permits desirable exposure of very large surface areas of material being treated by means of a relatively compact and economical construction. For example, with an apparatus of this invention having 21" diameter screws and a flight lead of ¾", it is possible to expose a surface area of approximately 1,000 square inches for each inch of length of the two screws. It it were attempted to do the same thing by exposing the material on a smooth roll, the roll would have to be approximately 320" in diameter to provide equivalent surface area per inch in length of the roll. Furthermore, the high degree of plug flow accompanied by local mixing and the ability to control feed rate independently of r.p.m. or to control r.p.m. independently of feed rate and, by this means, to obtain optimum residence time of the material during treatment and the optimum amount of surface exposed and remixing for exposure of new surfaces offers a treating system which is unique and permits superior performance as compared to existing devices.

In the case of relatively viscous materials, such as those in the range of 7,000 poises to 15,000 poises or higher, it is desirable to design the apparatus with features which will reduce the plastic drag of the material resisting screw rotation and thus reduce heat generation in the material and horsepower demand on the main drive. This reduction in heat generation is particularly required in larger machines.

A large part of the total energy is consumed between the outside diameter of the screw flights and the inside of the bore. As one considers larger and larger units, this heat generation can be reduced by increasing the clearance between the outside diameter of the screw and the inside of the bore. However, if this clearance is increased excessively, the flow of polymer in this area will become too random and the high degree of plug flow which chracterizes this apparatus will be lost. It has been determined that heat generation can be greatly reduced, when required, by relieving to a greater clearance a portion of the outside diameter of the screw flights while still maintaining a portion at the clearance required for satisfactory plug flow. In this connection, from 75% of the flights can be relieved to a depth which provides from 25% to 100% greater clearance than that between the outside diameter of the flights and the bore. This is illustrated in FIG. 8 wherein the standard clearance between the outside diameter of the flights and the bore is identified by numeral 55 and the relieved clearance between the flights and the bores is identified by numeral 56.

Based on the foregoing, it is believed that the construction, operation, objects and advantages of the present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

I claim:

1. In apparatus for treating a material, such as a liquid polymer:
    (a) a barrel defining a pair of generally horizontal, parallel, intersecting bores and having an upper passage which establishes communication between said bores and the exterior of the barrel;
    (b) a hood carried by the barrel and defining a chamber which communicates with said bores by way of said passage and which is adapted to be subjected to vacuum;
    (c) a pair of intermeshing screws of opposite hand and rotatable in unison in opposite direction, each screw having its axis disposed in a corresponding barrel bore and comprising:
        (1) generally V-shaped threads;
    (d) portions of the screws being spaced predetermined clearance distances, the clearance distance between a side surface of any V-shaped thread of one of the screws and the thereopposite side surface of the next adjacent V-shaped thread of the other screw being within the range of from 2% to 6% of the cube root of the outside diameter of either screw.

2. Apparatus according to claim 1 wherein:
    (a) the clearance distance between the outer diameter of the V-shaped threads of one of the screws and the inner diameter of the V-shaped threads of the other screw is within the range of from 2% to 6% of the cube root of the outside diameter of either screw.

3. Apparatus according to claim 1 wherein:
    (a) the pitch of the V-shaped threads of each screw is within the range of from 5% to 15% of its outside diameter.

4. Apparatus according to claim 1 wherein:
    (a) the depth of the V-shaped threads of each screw is within the range of from 20% to 30% of its outside diameter.

5. Apparatus according to claim 2 wherein:
    (a) the pitch of the V-shaped threads of each screw is within the range of from 5% to 15% of its outside diameter.

6. Apparatus according to claim 2 wherein:
    (a) the depth of the V-shaped threads of each screw is within the range of from 20% to 30% of its outside diameter.

7. Apparatus according to claim 6 wherein:
    (a) the pitch of the V-shaped threads of each screw is within the range of from 5% to 15% of its outside diameter.

8. Apparatus according to claim 1 wherein from 50% to 75% of the upstream portions of the flights of each screw are relieved to a depth which provides from 25% to 100% greater clearance than that between the outside diameter of each screw and the diameter of the corresponding barrel bore.

9. In apparatus for treating a material, such as a liquid polymer:
    (a) a barrel defining a pair of generally horizontal, parallel, intersecting bores;
    (b) partitioning means extending transversely across the bores, dividing each of the bores into a rear part and a forward part and having at least one through opening;
    (c) the barrel being provided with a pair of upper passages, one of the upper passages establishing communication between the rear part of each bore and the exterior of the barrel and the other upper passage establishing communication between the forward part of each bore and the atmosphere;
    (d) inlet means for continuously introducing a supply of the material into the ends of the rear parts of the bores remote from the partitioning means;
    (e) outlet means for discharging treated material from the ends of the forward parts of the bores remote from the partitioning means;
    (f) hood means carried by the barrel and defining a pair of chambers which respectively communicate with a rear part and a forward part of each bore by way of a corresponding said passage and which are subjected to vacuum;
    (g) a pair of intermeshing screws of opposite hand and rotatable in unison in opposite directions, each screw having its axis disposed in its corresponding bore and comprising:
        (1) a rear portion having generally V-shaped threads positioned in the rear part of its corresponding bore;
        (2) a forward portion having generally V-shaped threads positioned in the forward part of a corresponding bore; and
        (3) an intermediate portion between its rear and front portions and extending through the partitioning means; and
    (h) bearing means carried by the partitioning means for supporting and preventing radial thrust of the intermediate portion of each screw.

10. Apparatus according to claim 9 wherein:
    (a) intermeshing portions of the screws are spaced predetermined clearance distances, the clearance distance between a side surface of any V-shaped thread of one of the screws and the thereopposite side surface of the next adjacent V-shaped thread of the other screw being within the range of from 2% to 6% of the cube root of the outside diameter of either screw.

11. Apparatus according to claim 9 wherein:
    (a) the clearance distance between the outer diameter of the V-shaped threads of one of the screws and the inner diameter of the V-shaped threads of the other screw is within the range of from 2% to 6% of the cube root of the outside diameter of either screw.

12. Apparatus according to claim 9 wherein:
    (a) the pitch of the V-shaped threads of each screw is within the range of from 5% to 15% of its outside diameter.

13. Apparatus according to claim 9 wherein:
    (a) the depth of the V-shaped threads of each screw is within the range of from 20% to 30% of its outside diameter.

14. Apparatus according to claim 10 wherein:
    (a) the pitch of the V-shaped threads of each screw is within the range of from 5% to 15% of its outside diameter.

15. Apparatus according to claim 10 wherein:
    (a) the depth of the V-shaped threads of each screw is within the range of from 20% to 30% of its outside diameter.

16. Apparatus according to claim 15 wherein:
    (a) the pitch of the V-shaped threads of each screw is within the range of from 5% to 15% of its outside diameter.

17. Apparatus according to claim 9 wherein from 50% to 75% of the upstream portions of the flights of each screw are relieved to a depth which provides from 25% to 100% greater clearance than that between the outside diameter of each screw and the diameter of the corresponding barrel bore.

References Cited

UNITED STATES PATENTS 3,082,816  3/1963  Skidmore ---------- 159—2 X
3,114,171  12/1963  Colombo ------------ 18—12

FOREIGN PATENTS 761,569  11/1956  Great Britain.
1,161,852  1/1964  Germany.
1,153,887  9/1963  Germany.

NORMAN YUDKOFF, Primary Examiner.

J. SOFER, Assistant Examiner.

U.S. Cl. X.R.

18—12; 159—2